United States Patent [19]

Trifon et al.

[11] Patent Number: 5,132,138
[45] Date of Patent: * Jul. 21, 1992

[54] WOOD SEALING AND PROTECTING PROCESS

[75] Inventors: George Trifon, 743 Ridgeview Dr., Lilburn, Ga. 30247; Anthony O'Lenick, Jr., Lilburn, Ga.

[73] Assignee: George Trifon, Lilburn, Ga.

[*] Notice: The portion of the term of this patent subsequent to Nov. 12, 2008 has been disclaimed.

[21] Appl. No.: 753,405

[22] Filed: Aug. 30, 1991

Related U.S. Application Data

[63] Continuation-in-part of Ser. No. 587,098, Sep. 24, 1990, Pat. No. 5,064,688.

[51] Int. Cl.$^5$ ............................................. B32B 35/00
[52] U.S. Cl. .................................... 427/140; 427/155; 427/387; 427/393
[58] Field of Search ................ 427/140, 393, 155, 387

[56] References Cited

U.S. PATENT DOCUMENTS

| | | | |
|---|---|---|---|
| 3,341,338 | 9/1967 | Pater | 106/287.14 |
| 4,263,051 | 4/1981 | Crawford et al. | 106/287.14 |
| 4,844,826 | 7/1989 | Schaefer et al. | 106/287.14 |

Primary Examiner—Janyce Bell

[57] ABSTRACT

The present invention discloses a novel process for sealing, restoring and protecting wood surfaces. The process involves application of a reactive silicone compound in solvent to the surface being treated, the evaporation of solvent which starts a polymerization reaction of a silanic hydrogen containing silicone polymer on and within the surface of the wood. The silanic hydrogen containing silicone, which is delivered to the surface of the wood in a solvent, penetrates the wood surface. The evaporation of the solvent initiates the polymerization. The polymer matrix is built up around and within the wood fiber which the solvent solution has penetrated. The polymer fills the surface of the wood making a clear interlocked elastomeric surface which restores the appearance and provides the desired durability.

10 Claims, No Drawings

WOOD SEALING AND PROTECTING PROCESS

RELATED APPLICATIONS

This application is a continuation in part of Ser. No. 07/587,098, filed Sep. 24, 1990, now U.S. Pat. No. 5,064,688.

BACKGROUND OF THE INVENTION

(1) Field of Invention

The present invention relates to a novel process for sealing protecting and restoring wood and other porous surfaces. The process results in sealing, restoring and protecting the wood surfaces. The process involves application of a reactive silicone compound in solvent to the surface being treated, the evaporation of solvent which starts a polymerization reaction of a silanic hydrogen containing silicone polymer on and within the surface of the wood.

(2) Description of the Arts and Practices

Wood is a very commonly used material in many environments were appearance is very important. Wood is used for the construction of many different surfaces in our home, work and other environments. These applications include surfaces in furniture, panels, exterior surfaces of buildings. Recently, wood laminates have become popular. Wood laminates are very thin layers of wood applied to other surfaces principally for appearance. These laminates by virtue of their thinness are susceptible to degradation and surface wear which causes failures of the surface. It is highly desirable to provide a surface modifier which would strengthen the wood laminate without detracting from the wood's appearance.

Wooden surfaces, because of environmental stress, both physical and chemical degrade. Scratches and abrasions are an example of physical stress and the effects of acid rain and other environmental chemicals are examples of chemical stress. One method of restoring the appearance of wooden surfaces is to apply a wax formula. While the intent of the wax is to provide a hydrophobic coating to the surface of the wood, the effect is temporary and there is little alteration or improvement of the surface of the wood.

The ability to provide a durable film to wood which provides restorative, sealing and protecting properties in an easily applied treatment has been a long felt need in the industry.

SUMMARY OF THE INVENTION

The present invention discloses a novel process for sealing, restoring and protecting wood surfaces. The process involves application of a reactive silicone compound in solvent to the surface being treated, the evaporation of solvent which starts a polymerization reaction of a silanic hydrogen containing silicone polymer on and within the surface of the wood. The silanic hydrogen containing silicone, which is delivered to the surface of the wood in a solvent, penetrates the wood surface. The evaporation of the solvent initiates the polymerization. The polymer matrix is built up around and within the wood fiber which the solvent solution has penetrated. The polymer fills the surface of the wood making a clear interlocked elastomeric surface which restores the appearance and provides the desired durability.

OBJECT OF THE INVENTION

It is accordingly an object of the present invention to provide a composition for the protection, treatment and restoration of wood and other porous surfaces. It is a further object of the invention to provide a process for sealing the porous surface of wood so that oils and other soils cannot enter the wood surface. The compounds of the present invention are useful in providing protecting of porous surfaces from graffiti.

It is still further and object to provide a polymeric coating to the wood's porous surface which is resistant to chemical as well as physical degradation. The restorative process results in a durable water resistant coating.

Still other objects and advantages will readily present themselves to one skilled in the art upon reference to the following specification and claims.

DESCRIPTION OF THE PREFERRED EMBODIMENTS

According to the invention it had been discovered that a stable polymeric composition can be prepared which is suitable for preserving, sealing and restoring wood surfaces. The compositions of the present invention contain (a) a silanic hydrogen containing silicone polymer conforming to the following structure;

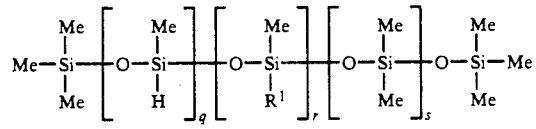

wherein;

$R^1$ is selected from lower alkyl having one to eight carbon atoms and phenyl;

q is an integer from 1 to 1,000;

r and s are independently integers from 0 to 1,000;

Me is methyl;

(b) an organic solvent selected from mineral spirits, kerosene, d limonene and 1, 1, 1 trichloroethane; and optionally (c) a catalyst containing tin, zirconium and titanium.

The percentage of silanic hydrogen containing polymer may range from 90% to 2% but typically is 40 to 60%.

The percentage of solvent may range from 10% to 98% but typically is 60 to 40%.

The percentage of catalyst may range from 0% to 10% but typically is 1 to 5%.

In a preferred embodiment, the silanic hydrogen containing silicone polymer contains an $R^1$ moiety which is octyl ($C_8H_{17}$) or phenyl. These moieties make the resulting polymer more hydrophobic and consequently more resistant to harsh chemicals.

In another preferred embodiment, the silanic hydrogen containing silicone polymer contains has a viscosity of below 1,000 csp. Such a polymer has a molecular weight below 2,000 MWU and is small enough to penetrate the matrix of the polymeric top coat and once the solvent evaporates polymerize. This polymerization of the silicone which prior to polymerization penetrates the top coat, results in an interlocked polymer matrix were the silicone and top coat overlap. This results in a uniform coat and a durable finish at the overlap point between the silicone and top coat matrix. It will be understood that the event which initiates the polymerization is the evaporation of solvent.

In still another preferred embodiment a catalyst is added to the composition. Once the solvent evaporates, the catalyst will influence the speed of polymerization and the degree of cross link density. High cross link density is desirable for increased durability of the silicone polymer film. Speed of reactivity is desirable for decreasing the time needed to treat each car.

The compositions of the present invention can be applied with a cloth, a brush or a spray applicator. The surface should be clean and dry before application. Once applied the compositions should be allowed a period of 30 minutes to 3 hours to polymerize.

RAW MATERIAL EXAMPLES

The silanic hydrogen containing silicone compounds are available commercially from Siltech Inc. Norcross, Ga., and are selected from;

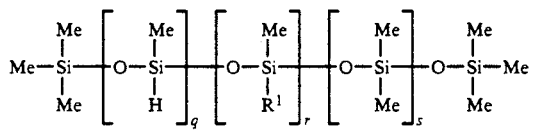

| Reactant # | q | s | r | $R^1$ |
| --- | --- | --- | --- | --- |
| 1 | 50 | 50 | 0 | — |
| 2 | 90 | 10 | 0 | — |
| 3 | 10 | 90 | 0 | — |
| 4 | 99 | 1 | 10 | Phenyl |
| 5 | 1 | 99 | 100 | Octyl |
| 6 | 50 | 150 | 10 | Phenyl |
| 7 | 150 | 50 | 0 | — |
| 8 | 100 | 0 | 0 | — |
| 9 | 100 | 1 | 100 | Phenyl |
| 10 | 25 | 25 | 25 | Octyl |
| 11 | 5 | 5 | 5 | Ethyl |
| 12 | 10 | 0 | 10 | Octyl |
| 13 | 100 | 250 | 10 | Phenyl |

PREPARATION OF COMPOSITIONS

The compositions of the current invention are prepared by adding the specified amount of the specified silicone compound to the specified amount of the specified solvent under good agitation. The specified amount of the specified catalyst is then added where indicated.

EXAMPLE #14

| Silanic Hydrogen Compound Example/Grams | Solvent Type/Grams | Catalyst Type/Grams |
| --- | --- | --- |
| 1 100.0 Grams | Mineral Spirits 100.0 Grams | Isopropanol Titinate 2.0 Grams |

EXAMPLE #15

| Silanic Hydrogen Compound Example/Grams | Solvent Type/Grams | Catalyst Type/Grams |
| --- | --- | --- |
| 2 50.0 Grams | Mineral Spirits 100.0 Grams | Isopropyl Titinate 2.0 Grams |

EXAMPLE #16

| Silanic Hydrogen Compound Example/Grams | Solvent Type/Grams | Catalyst Type/Grams |
| --- | --- | --- |
| 3 100 Grams | Mineral Spirits 100.0 Grams | Isopropyl Titinate 2.0 Grams |

EXAMPLE #17

| Silanic Hydrogen Compound Example/Grams | Solvent Type/Grams | Catalyst Type/Grams |
| --- | --- | --- |
| 4 200 Grams | Mineral Spirits 100.0 Grams | Isopropyl Titinate 2.0 Grams |

EXAMPLE #18

| Silanic Hydrogen Compound Example/Grams | Solvent Type/Grams | Catalyst Type/Grams |
| --- | --- | --- |
| 5 100 Grams | Mineral Spirits 100.0 Grams | Isopropyl Titinate 2.0 Grams |

EXAMPLE #19

| Silanic Hydrogen Compound Example/Grams | Solvent Type/Grams | Catalyst Type/Grams |
| --- | --- | --- |
| 6 100 Grams | Mineral Spirits 100.0 Grams | Isopropyl Titinate 2.0 Grams |

EXAMPLE #20

| Silanic Hydrogen Compound Example/Grams | Solvent Type/Grams | Catalyst Type/Grams |
| --- | --- | --- |
| 7 50.0 Grams | Mineral Spirits 100.0 Grams | Tin Oxalate 2.0 Grams |

EXAMPLE #21

| Silanic Hydrogen Compound Example/Grams | Solvent Type/Grams | Catalyst Type/Grams |
| --- | --- | --- |
| 8 75.0 Grams | Mineral Spirits 100.0 Grams | Tin Oxalate 2.0 Grams |

EXAMPLE #22

| Silanic Hydrogen Compound Example/Grams | Solvent Type/Grams | Catalyst Type/Grams |
| --- | --- | --- |
| 9 150.0 Grams | Mineral Spirits 100.0 Grams | Tin Oxalate 2.0 Grams |

EXAMPLE #23

| Silanic Hydrogen Compound Example/Grams | Solvent Type/Grams | Catalyst Type/Grams |
| --- | --- | --- |
| 10 200.0 Grams | Mineral Spirits 100.0 Grams | Tin Oxalate 2.0 Grams |

EXAMPLE #24

| Silanic Hydrogen Compound Example/Grams | Solvent Type/Grams | Catalyst Type/Grams |
|---|---|---|
| 11    900.0 Grams | Mineral Spirits 100.0 Grams | Tin Oxalate 2.0 Grams |

EXAMPLE #25

| Silanic Hydrogen Compound Example/Grams | Solvent Type/Grams | Catalyst Type/Grams |
|---|---|---|
| 12    100.0 Grams | Mineral Spirits 100.0 Grams | Tin Oxalate 2.0 Grams |

EXAMPLE #26

| Silanic Hydrogen Compound Example/Grams | Solvent Type/Grams | Catalyst Type/Grams |
|---|---|---|
| 13    100.0 Grams | Mineral Spirits 100.0 Grams | Isopropyl Titinate 2.0 Grams |

EXAMPLE #27

| Silanic Hydrogen Compound Example/Grams | Solvent Type/Grams | Catalyst Type/Grams |
|---|---|---|
| 1    100.0 Grams | 1,1,1 Trichloro-ethane 100.0 Grams | None |

EXAMPLE #28

| Silanic Hydrogen Compound Example/Grams | Solvent Type/Grams | Catalyst Type/Grams |
|---|---|---|
| 2    100.0 Grams | 1,1,1 Trichloro-ethane 100.0 Grams | Zirconium Acetate 1.0 Gram |

EXAMPLE #29

| Silanic Hydrogen Compound Example/Grams | Solvent Type/Grams | Catalyst Type/Grams |
|---|---|---|
| 3    100.0 Grams | d limonene 100.0 Grams | Zirconium Acetate 1.0 Gram |

EXAMPLE #30

| Silanic Hydrogen Compound Example/Grams | Solvent Type/Grams | Catalyst Type/Grams |
|---|---|---|
| 4    100.0 Grams | d limonene 100.0 Grams | Zirconium Acetate 1.0 Gram |

EXAMPLE #31

| Silanic Hydrogen Compound Example/Grams | Solvent Type/Grams | Catalyst Type/Grams |
|---|---|---|
| 5    100.0 Grams | d limonene | Zirconium Acetate |

-continued

| Silanic Hydrogen Compound Example/Grams | Solvent Type/Grams | Catalyst Type/Grams |
|---|---|---|
| | 100.0 Grams | 0.5 Grams |

EXAMPLE #32

| Silanic Hydrogen Compound Example/Grams | Solvent Type/Grams | Catalyst Type/Grams |
|---|---|---|
| 6    100.0 Grams | Kerosene 100.0 Grams | Zirconium Acetate 0.5 Grams |

EXAMPLE #33

| Silanic Hydrogen Compound Example/Grams | Solvent Type/Grams | Catalyst Type/Grams |
|---|---|---|
| 7    100.0 Grams | Kerosene 100.0 Grams | Zirconium Acetate 1.0 Grams |

EXAMPLE #34

| Silanic Hydrogen Compound Example/Grams | Solvent Type/Grams | Catalyst Type/Grams |
|---|---|---|
| 8    100.0 Grams | Kerosene 100.0 Grams | Zirconium Acetate 0.5 Grams |

EXAMPLE #35

| Silanic Hydrogen Compound Example/Grams | Solvent Type/Grams | Catalyst Type/Grams |
|---|---|---|
| 9    100.0 Grams | Kerosene 100.0 Grams | Zirconium Acetate 0.5 Grams |

EXAMPLE #36

| Silanic Hydrogen Compound Example/Grams | Solvent Type/Grams | Catalyst Type/Grams |
|---|---|---|
| 10    100.0 Grams | d limonene 100.0 Grams | Zirconium Acetate 0.5 Grams |

EXAMPLE #37

| Silanic Hydrogen Compound Example/Grams | Solvent Type/Grams | Catalyst Type/Grams |
|---|---|---|
| 11    100.0 Grams | Kerosene 100.0 Grams | Zirconium Acetate 1.0 Gram |

EXAMPLE #38

| Silanic Hydrogen Compound Example/Grams | Solvent Type/Grams | Catalyst Type/Grams |
|---|---|---|
| 12    100.0 Grams | Kerosene 100.0 Grams | Zirconium Acetate 1.0 Gram |

EXAMPLE #39

| Silanic Hydrogen Compound Example/Grams | Solvent Type/Grams | Catalyst Type/Grams |
|---|---|---|
| 13 100.0 Grams | 1,1,1, Trichloroethane 100.0 Grams | Zirconium Acetate 0.5 Grams |

EVALUATION PROCEDURE

Gloss Improvement

The compositions of the present invention were applied to the surface of untreated fir wood. The surface was not finished and had a rough corse finish. The appearance was rated on a scale of 0–5. A rating of 0 meant no change in the rough gloss free wood's appearance, a rating of 5 indicated a high degree of gloss.

| Composition Example Number | Rating |
|---|---|
| None | 0 |
| Mineral Spirits Alone | 1 |
| 14 | 5 |
| 17 | 4 |
| 18 | 4 |
| 21 | 4 |
| 22 | 4 |
| 25 | 4 |
| 27 | 5 |
| 30 | 5 |
| 35 | 5 |
| 39 | 4 |

As can be seen by the above data the compositions of the present invention seal, restore and preserve the wood surface to which they are applied.

SEALANT PROPERTIES

The ability of the process of the current invention to waterproof and seal wood was demonstrated using a several 2 inch by 4 inch by 4 inch blocks of pine wood. The wooden blocks were treated with one gram of the indicated solution and allowed to air dry for 24 hours at ambient temperatures. The wood blocks were then each submerged in five gallons of ambient tap water. The blocks were removed blotted dry and weighed. The amount of water picked up by the block was recorded and expressed as a percentage pick up. The formula for the calculation is;

% Water Pick up $$= \frac{\text{Weight of block after treatment} - \text{Weight of block before treatment}}{\text{Weight of block before treatment}}$$

The greater the water pick up the less effective the sealant.

| Composition Example Number | % Water Pick up |
|---|---|
| None | 52 |
| Mineral Spirits | 46 |
| 14 | 5 |
| 17 | 8 |
| 18 | 7 |
| 21 | 10 |
| 22 | 11 |
| 25 | 7 |
| 27 | 5 |
| 30 | 5 |
| 35 | 13 |
| 39 | 10 |

As can be clearly seen the process of the present invention provides water sealant properties to wood. The same sealant test was rerun using mineral oil in place of the water. Here again the process resulted in good sealant properties. This finding is important for anti graffiti applications. Paint will not penetrate the wood and be easily removed from the wooden surface.

What is claimed:

1. A process for sealing, protecting and restoring porous wood surfaces which comprises contacting the surface with an effective amount of a reactive composition which comprises;
    (a) a silanic hydrogen containing silicone polymer conforming to the following structure;

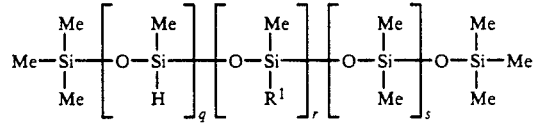

wherein;
$R^1$ is selected from lower alkyl having one to eight carbon atoms and phenyl;
q is an integer from 1 to 1,000;
r and s are independently integers from 0 to 1,000;
Me is methyl;
    (b) an organic solvent selected from mineral spirits, kerosene, d limonene and 1,1,1 trichloroethane; and optionally
    (c) a catalyst containing tin, zirconium and titanium.

2. The process of claim 1 wherein the percentage of silanic hydrogen containing polymer ranges from 90% by weight to 2% by weight.

3. The process of claim 1 wherein the percentage of solvent ranges from 10% by weight to 98% by weight.

4. The process of claim 1 wherein the percentage of catalyst may range from 0% by weight to 10% by weight.

5. The process of claim 1 wherein the percentage of solvent ranges from 50% by weight to 90% by weight.

6. The process of claim 1 wherein the percentage of catalyst ranges from 0.5% by weight to 5.0% by weight.

7. The process of claim 1 wherein $R^1$ is $C_8H_{17}$.

8. The process of claim 1 wherein $R^1$ is phenyl.

9. The process of claim 1 wherein $R^1$ is methyl.

10. The process of claim 1 wherein the silanic hydrogen containing silicone polymer has a molecular weight below 2,000 Molecular Weight Units.

* * * * *